United States Patent Office 3,527,811
Patented Sept. 8, 1970

3,527,811
1,1,2 - TRIFLUORO - 2 - BROMOETHYL DIFLUOROMETHYL ETHER AND ITS METHODS OF PREPARATION
Ross C. Terrell, Summit, N.J., assignor to Air Reduction Company, Incorporated, New York, N.Y., a corporation of New York
No Drawing. Original application Oct. 3, 1966, Ser. No. 583,929, now Patent No. 3,449,504. Divided and this application June 12, 1968, Ser. No. 758,169
Int. Cl. C07c *43/00, 43/12*
U.S. Cl. 260—614                1 Claim

ABSTRACT OF THE DISCLOSURE

This invention relates to the novel compound 1,1,2-trifluoro-2-bromoethyl difluoromethyl ether having the formula $CHF_2OCF_2CHFBr$. The compound is prepared for fluorination of corresponding dichloromethyl ether using fluorinating agents in the presence of antimony salts and tetravalent halides as fluorination catalysts. The compound is useful as an anesthetic and as a solvent and dispersant for fluorinated materials.

CROSS-REFERENCE TO RELATED APPLICATION

This is a division of copending application Ser. No. 583,929, filed Oct. 3, 1966, now Pat. No. 3,449,504.

This invention relates to the new compound 1,1,2-trifluoro-2-bromoethyl difluoromethyl ether having the structural formula $CHF_2OCF_2CHFBr$, and its method of preparation.

1,1,2 - trifluoro-2-bromoethyl difluoromethyl ether is readily prepared by fluorinating the corresponding dichloromethyl ether in the presence of a suitable fluorination catalyst, according to the following reaction equation:

(1)  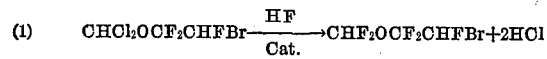

Fluorinating agents useful in carrying out the above reaction are hydrogen fluoride (HF) and antimony trifluoride ($SbF_3$). The fluorination catalysts used comprise pentavalent antimony salts such as $SbF_5$, $SbCl_5$, or tetravalent stannic halides such as $SnCl_4$. When $SbF_3$ is used as the fluorination agent the reaction proceeds advantageously at the boiling point of the product and the product is distilled from the reaction mixture as formed. When hydrogen fluoride is used as fluorination agent the reaction can be carried out at temperatures up to the boiling point of the reaction mixture. Lower temperatures are preferred, as the yields are higher. A temperature of 0°–10°C. is preferred.

The use of the above catalysts is required in order to carry out the fluorination effectively. In the absence of such catalysts the fluorinating agents are inoperative. Preferably the catalyst is used in an amount comprising from ½ to 10% by weight (calculated as $SbCl_5$) of the reaction mixture. Upon completion of the reaction the product is readily separated by distillation.

The precursor dichloromethyl ether employed in the preparation of the new difluoromethyl ether is a new compound. It may advantageously be prepared by chlorination of 1,1,2-trifluoro-2-bromoethyl methyl ether in accordance with the following reaction equation:

(2)  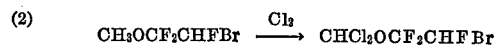

The chlorination advantageously is carried out at temperatures of 20°–40° C. and the reaction proceeds readily in the presence of incandescent light to yield the desired $CHCl_2OCF_2CHFBr$ which is used in the subsequent fluorination.

The following examples illustrate the preparation of the new compound.

EXAMPLE I

Preparation of the intermediate $CHCl_2OCF_2CHFBr$

To a 3-necked round-bottomed flask fitted with a "Dry Ice" condenser, a fritted glass gas inlet tube, a thermometer, and a stirrer, was charged 579 g. (3 moles) of $CH_3OCF_2CHFBr$. After flushing the system with nitrogen, chlorine gas was added via the inlet tube while the reaction was stirred and illuminated with a 300 watt incandescent lamp. The chlorination was rapid and exothermic and the reactor was cooled to hold the temperature between 30° and 35° C. The effluent gases were led from the top of the condenser to a water scrubber which was titrated at intervals with standard base. When a total of 1.6 moles of HCl per mole of ether was titrated the reaction was stopped. The crude product obtained weighed 743 g. which corresponded to the addition of 1.57 moles of chlorine per mole of the starting ether. Fractional distillation of this mixture using a 2.5 x 100 cm. column packed with ¼ in. Penn State packing yielded 195 g., B.P. 58°–61° C. at 50 mm., $n_D^{20}$ 1.4035–1.4052 consisting of $CH_2ClOCF_2CHFBr$ which can be recycled to the chlorination and 320 g., B.P. 62° C. at 50 mm., $n_D^{20}$ 1.4112–1.4135 consisting of $CHCl_2OCF_2CHFBr$.

*Analysis.*—Calc. for $C_3H_2BrCl_2F_3O$ (percent): C, 13.78; H, 0.76; F, 21.7. Found (percent): C, 13.73; H, 0.77; F, 21.1.

EXAMPLE II

Preparation of $CHF_2OCF_2CHFBr$

To a mixture of 289 g. $CHCl_2OCF_2CHFBr$ prepared as described in Example I and 7 g. (2.5% by weight) $SbCl_5$ was added anhydrous hydrogen fluoride while the temperature was maintained at 0±5° C. The reaction was carried out in a 3-necked stainless steel flask fitted with a stainless steel stirrer, a thermocouple well and a copper "Dry Ice" condenser. The amount of hydrogen fluoride added was measured by titration of the HCl given off. At the end of the reaction (total HCl evolved: about 2 mole per mole of starting ether) the mixture was poured into water and the organic layer 192 g., ($n_D^{20}$ 1.3380) recovered. The crude product was distilled in a 60 x 2 cm. column packed with glass helices giving 125 g. of substantially pure $CHF_2OCF_2CHFBr$, B.P. 73.5° C., $n_D^{20}$ 1.3313.

*Analysis.*—Calc. (percent): C, 15.75; H, 0.87; F, 41.5. Found (percent): C, 15.97; H, 0.83; F, 41.5.

EXAMPLE III

To a stirred mixture of antimony trifluoride (100 g.) and antimony pentachloride (2 g.) in a stainless steel flask was added a total of 153 g. of $CHCl_2OCF_2CHFBr$. The ether was added slowly, keeping the reaction temperature at 60°–70° C. The product was distilled from the reaction mixture as it was formed. The total distillate was washed with cold 2N base and dried over $K_2CO_3$ to give 56 g. of crude ether.

Fractional distillation gave 40 g. of pure product, B.P. 73° C., $n_D^{20}$ 1.3313.

1,1,2-trifluoro-2-bromoethyl difluoromethyl ether is a stable compound. It does not undergo degradation in the presence of alkali or light. It is easily miscible with other organic liquids including fats and oils and has useful solvent properties such as for example as a solvent for fluorinated olefins and other fluorinated materials, such for example as fluorowaxes. It may be used to prepare pastes and dispersions of such materials useful for coatings and the like and may be used as a degreasing agent.

1,1,2-trifluoro-2-bromoethyl difluoromethyl ether exhibits anesthetic properties in mammals and has been used effectively for inducing and maintaining anesthesia in laboratory animals, such as mice and dogs, when administered by inhalation. The agent is non-flammable. It lends itself to effective use as an inhalant anesthetic in respirable mixtures containing life-supporting concentrations of oxygen. In addition, studies with the agent have shown that it is highly potent, affords good muscular relaxation, is nontoxic, produces minimal irritation and accretions, possesses a high margin of safety, affords rapid induction and recovery, affords ease of control of levels of anesthesia.

Illustrative of the effectiveness of the agent are the tests conducted with mice in which separate groups of five mice were placed in 1 liter jars previously flushed with oxygen and charged with varying predetermined amounts of the agent. These tests showed the agent to be an effective anesthetic at concentrations as low as 1.25% by volume. At higher concentrations reduction of the induction time occurred, for example at 1.90% induction occurred in approximately 0.60 minute and at 2.5% concentration in about 0.40 minute. After 10 minutes exposure to such respirable atmospheres the test animals were withdrawn and recovered promptly, the recovery for example occurring almost immediately at the 1.25% concentration level and after about 1.85 minutes and 4.17 minutes after exposure at the 1.90% and 2.50% anesthetic levels respectively.

The closed-system with face mask were employed for administration of the agent in connection with the dog. At a dose level of 1.1–1.2 ml./kg./hr. the mean induction in the dog was about 2–4 minutes and the recovery time 5–16 minutes.

It should be understood that the foregoing disclosure relates only to a preferred embodiment of the invention and that it is intended to cover all changes and modifications of the example of the invention herein chosen for the purpose of the disclosure which does not constitute departure from the spirit and scope of the invention.

I claim:

1. 1,1,2-trifluoro-2-bromoethyl difluoromethyl ether having the formula $$CHF_2-O-CF_2CHFBr$$

References Cited

UNITED STATES PATENTS

| | | |
|---|---|---|
| 2,066,905 | 1/1937 | Booth. |
| 2,803,665 | 8/1957 | Miller et al. |
| 2,803,666 | 8/1957 | Miller et al. |
| 3,095,354 | 6/1963 | Larsen et al. 404—366 XR |
| 3,216,897 | 11/1965 | Krantz 424—342 |
| 3,278,615 | 10/1966 | Larsen et al. |

OTHER REFERENCES

Gubanov et al., Zh. Obsrch. Khim., 34(8) pp. 2802–2803, 1964.

Tumanova et al., Zh. Obsrch. Khim., 35(3), pp. 587–588, 1965.

Clayton et al., Jour. Chem. Soc., (1965) p. 7377.

Park et al., Jour. Amer. Chem. Soc., 74, pp. 2292–2294, 1952.

Hudlicky, Chemistry of Organic Fluorine Compounds, Macmillan Co., New York, 1962, pp. 91–97.

LEON ZITVER, Primary Examiner

H. T. MARS, Assistant Examiner